United States Patent
Hyun et al.

(10) Patent No.: US 6,834,199 B2
(45) Date of Patent: Dec. 21, 2004

(54) PORTABLE TELEPHONE WITH AN EXCHANGEABLE DATA INPUT APPARATUS

(75) Inventors: Sang-Min Hyun, Kyonggi-do (KR); Seung-Min Park, Seoul (KR); Ji-Yun Park, Seoul (KR); Kyoun-Sun Cho, Seoul (KR); Yong-Jae Kim, Suwon (KR); Young-Mok Jeon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 445 days.

(21) Appl. No.: 10/100,801

(22) Filed: Mar. 19, 2002

(65) Prior Publication Data

US 2002/0132640 A1 Sep. 19, 2002

(30) Foreign Application Priority Data

Mar. 19, 2001 (KR) ........................................ 2001-13979
Mar. 5, 2002 (KR) ........................................ 2001-11512

(51) Int. Cl.[7] .............................. H04B 1/38; H04B 1/08
(52) U.S. Cl. ................ 455/575.1; 455/90.3; 455/575.1; 455/575.3; 455/347; 379/449; 379/455
(58) Field of Search ................................. 455/347, 348, 455/575.1, 575.3, 575.8, 90.3; 379/449, 454, 455

(56) References Cited

U.S. PATENT DOCUMENTS

| | | | | |
|---|---|---|---|---|
| 5,436,954 A | * | 7/1995 | Nishiyama et al. | 455/566 |
| 5,564,078 A | * | 10/1996 | Nagai | 455/575.3 |
| 6,438,229 B1 | * | 8/2002 | Overy et al. | 379/446 |
| 6,519,483 B1 | * | 2/2003 | Watanabe | 455/575.1 |
| 6,549,789 B1 | * | 4/2003 | Kfoury | 455/550.1 |
| 6,603,959 B1 | * | 8/2003 | Peiker | 455/575.1 |

* cited by examiner

Primary Examiner—Simon Nguyen
(74) Attorney, Agent, or Firm—Dilworth & Barrese LLP

(57) ABSTRACT

A portable telephone with an exchangeable data input apparatus is provided. The portable telephone includes a bar-type main housing; a holding housing having first and second hinges positioned to face each other, to be protrusive, and to be symmetrical with each other and a sliding surface with a predetermined radius of curvature to be separated from the first and second hinges and attached to and detached from the main housing; and an exchangeable housing having bar-type first and second rotational sub housings with each one side connected to the first and second hinges so that the first and second rotational sub housings are hidden in the main housing when folded in and are in the form of wings protruding from both sides of the main housing when they are unfolded.

13 Claims, 17 Drawing Sheets

PORTABLE TELEPHONE WITH AN EXCHANGEABLE DATA INPUT APPARATUS

PRIORITY

This application claims priority to an application entitled "Portable Telephone with an Exchangeable Data Input Apparatus" filed in the Korean Industrial Property Office on Mar. 19, 2001 and assigned Serial No. 2001-13979, and an application entitled "Portable Telephone with an Exchangeable Data Input Apparatus" filed in the Korean Industrial Property Office on Mar. 5, 2002 and assigned Serial No. 2002-11512, the contents of both of which are hereby incorporated by reference.

BACKGROUND OF THE INVENTION

1. Field of the Invention

The present invention relates generally to a portable telephone with an exchangeable data input apparatus also used as a cradle, and in particular, to a portable telephone with an exchangeable data input apparatus with two housings unfoldable against each other in the form of wings.

2. Description of the Related Art

A portable telephone such as a commonly used cellular phone provides radio communication services to a user through radio communications with a base station. Portable telephones are divided into bar-type portable telephones, flip-type portable telephones, and folder-type portable telephones according to their appearances. Also, portable telephones are classified as neck wearable type portable telephones and wrist type portable telephones according to wearing positions. Portable telephones may also be classified according to functions such as audio communication, video communication, and Internet communication. Portable telephones are additionally used for games or Music Player 3 (MP3).

Currently, the bar-type telephone, the flip-type telephone, and the folder-type telephones are most commonly used due to their portability. However, it is expected that in the near future a portable telephone adopting various wearing methods and a portable telephone cans receive various services with more functions will be mainly used in order to secure convenience of wearing and to cope with various multimedia environments.

Herein below, reference will be made to a commonly used folder-type telephone, as an example, in order to schematically explain the structure of a portable telephone. A conventional folder-type telephone includes a main housing, a folder, and a hinge means for connecting the main housing to the folder to thus fold the folder toward the main housing and to unfold the folder away from the main housing. A data input means such as a keypad can be positioned in the main housing and a data output means such as an LCD (Liquid Crystal Display) can be positioned in the folder. To the contrary, the data output means can also be positioned in the main housing and the data input means can be positioned in the folder. Also, a microphone (or a mouthpiece) can be positioned in the main housing and a speaker (or earpiece) can be positioned in the folder. It is possible to secure enough distance between an ear and the mouth of a user when the user makes a portable telephone call because the microphone and the speaker are mounted in this manner.

As stated above, a common keypad with a plurality of keys is used as a typical data input means of the portable telephone, in particular, of the portable cellular telephone. A liquid crystal display (LCD) is used as the data output means. A touch screen or a touch pad may also be used as the data input means. In the cellular telephone, elements such as the data input and output means, the earpiece and the mouthpiece are integrated into one body for miniaturization and lightness.

Current portable telephones tend to be lighter and smaller than older portable phones. When the main body of the portable telephone is miniaturized, the LCD and the keypad must also be miniaturized. When the LCD is miniaturized, it is not easy for the user to read displayed data. When the keypad is miniaturized, it is not easy to input data. The miniaturization of the portable telephone is restricted due to the above-mentioned technical problems. Also, it is difficult to maintain the larger sizes of the LCD and the keypad while miniaturizing the portable telephone.

Currently, in many cases, the user must input complex data for Internet communications and e-mail transmission. Accordingly, a portable telephone designed for convenient Internet communication and e-mail transmission is necessary.

The conventional portable telephone has limitations in supporting various functions used in the multimedia environment. For example, when a user plays games with the conventional portable telephone, function keys required for the games are repeatedly used in the conventional keypad. Therefore, the eyes and the fingers of the user become tired.

Further, in the conventional portable telephone, the sizes of the keys are too small to perform various functions when the size of the main body of the portable telephone is minimized. Accordingly, it is inconvenient for the user to use the conventional portable telephone.

SUMMARY OF THE INVENTION

It is, therefore, an object of the present invention to provide a portable telephone with an unfolding data input apparatus in the form of wings.

It is another object of the present invention to provide a portable telephone with keypad housings that are exchangeable and designed according to functions such as games, chatting, and MP3.

It is further another object of the present invention to provide a portable telephone with keypad housings that can be simultaneously unfolded away from each other.

To achieve the above and other objects, a portable telephone is provided, comprising a bar-type main housing; a holding housing having first and second hinges positioned to face each other, to be protrusive, and to be symmetrical with each other, and a sliding surface with a predetermined radius of curvature to be separated from the first and second hinges and attached to and detached from the main housing; and an exchangeable housing having bar-type first and second rotational sub housings, each one side connected to the first and second hinges so that the first and second rotational sub housings are hidden in the main housing when they are rotated to be close to each other (folded in) and are in the form of wings protruding from both sides of the main housing when they are rotated away from each other (unfolded).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
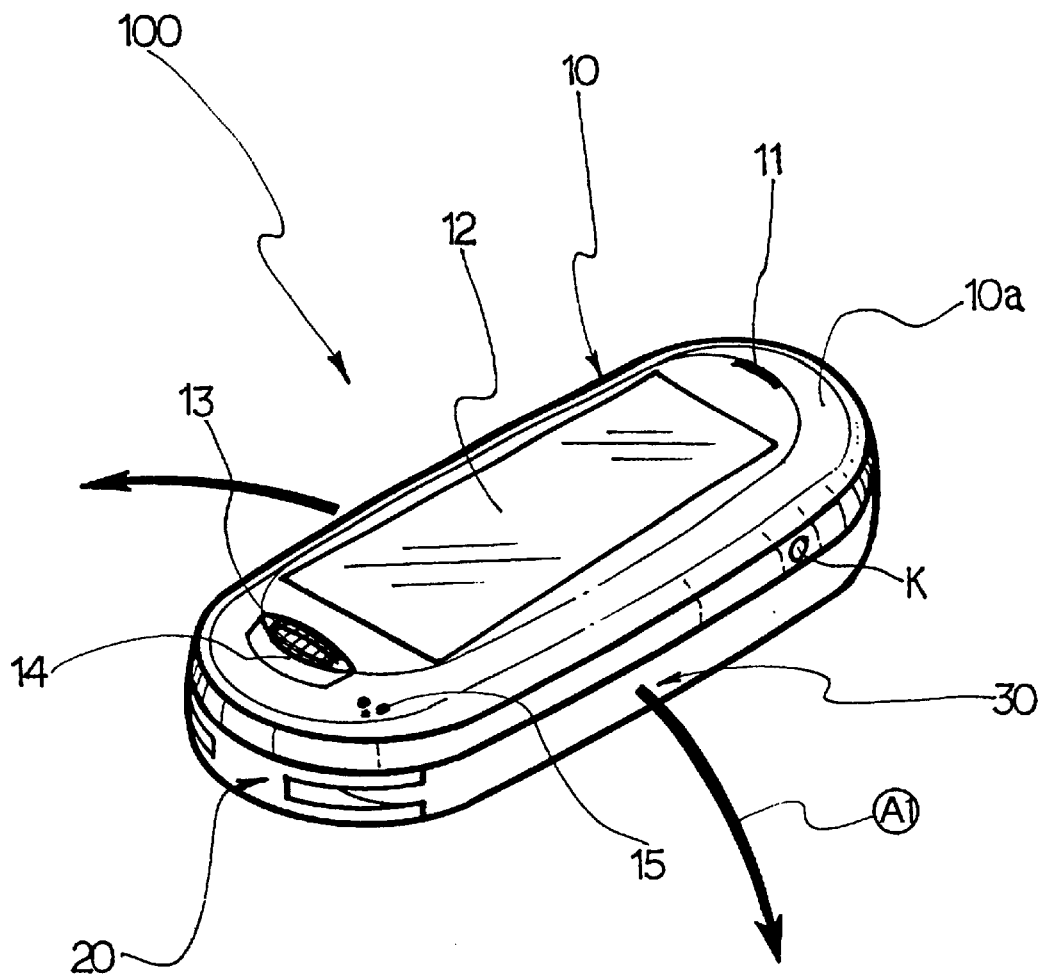
FIG. 1 is a perspective view illustrating a main housing combined with an exchangeable housing according to a preferred embodiment of the present invention.
Figure 2:
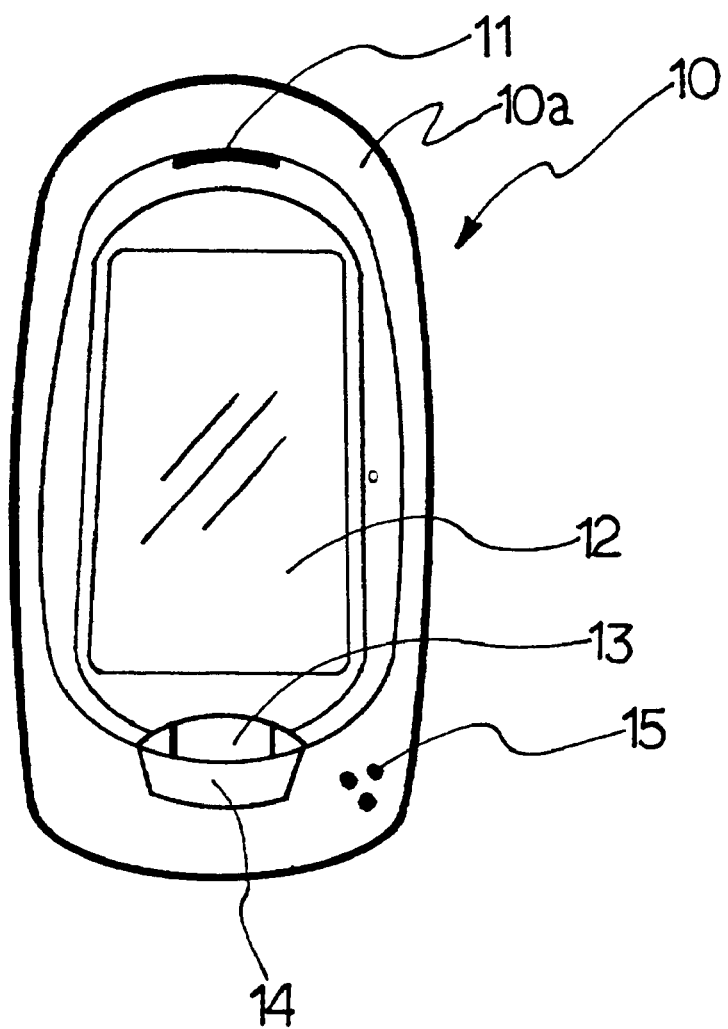
FIG. 2 is a plan view of the main housing illustrated in FIG. 1.

As illustrated in FIGS. 1 and 2, a portable telephone according to the present invention includes a bar-type main housing 10, a holding housing 20 attachable to and detachable from the main housing 10, and an exchangeable housing 30 whose rotational sub housings are connected to the holding housing 20, to thus rotate to be close to each other (fold in) and to be far away from each other (unfold). The size of the portable telephone according to the present invention depends on the size of the main housing, determined such that it is convenient for a user to carry and to speak over the portable telephone. When additional functions such as games, chatting, e-mail, and MP3 are used, the rotational sub housings of the exchangeable housing 30 can be unfolded away from each other in the directions marked with an arrow A1. At this time, signal exchange between the main housing 10 and the exchangeable housing 30 is performed using a Bluetooth module or an electrical connecting means.

The main housing 10 includes a large-scale liquid crystal display (LCD) 12 mounted in the center of an upper surface 10a, a speaker 11 positioned above the LCD 12, a microphone 15 positioned below the LCD 12, and a scroll key 13, e.g. a device similar to a mouse wheel button, and a control button 14 positioned between the LCD 12 and the microphone 15. Peripheral devices, e.g., an earphone jack, etc, connect through terminal K on the side of the main housing 10.

Figure 3:
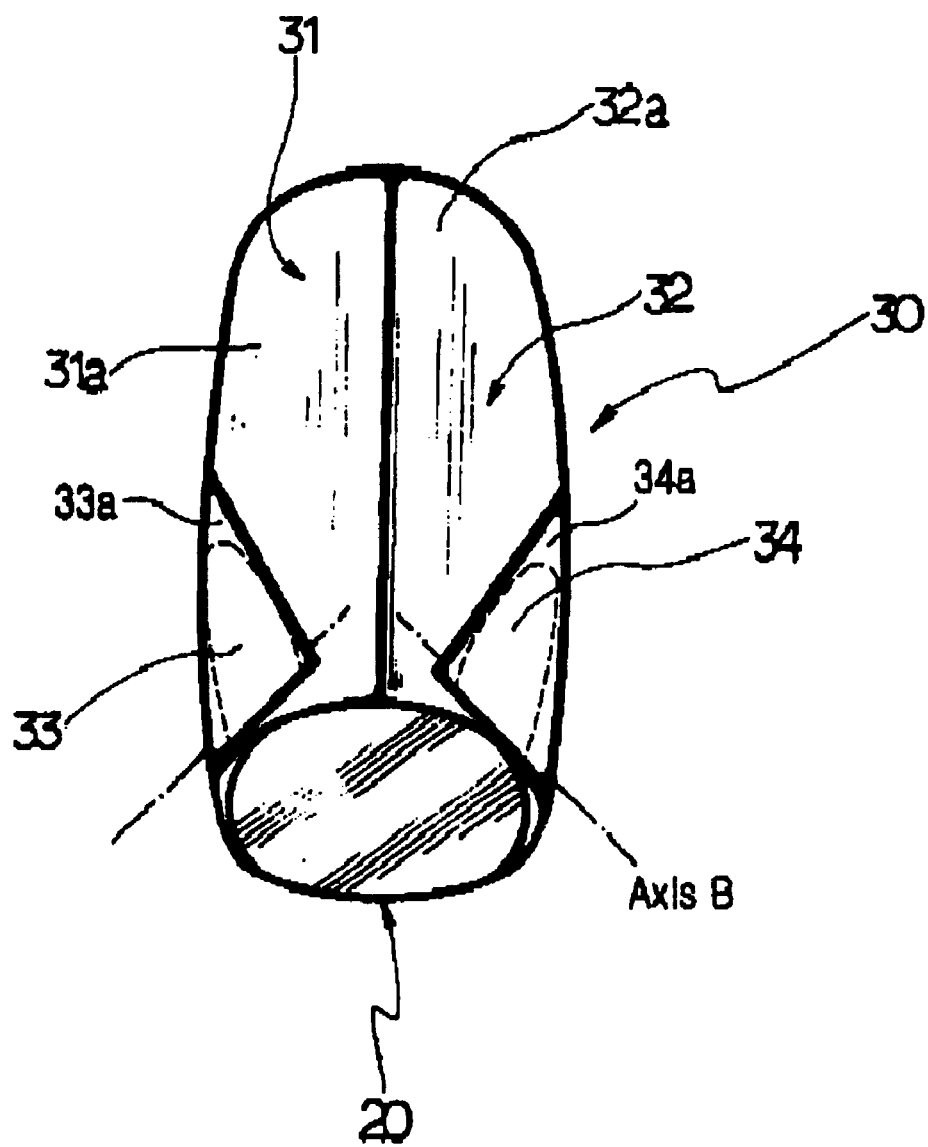
FIG. 3 is a bottom view of the main housing illustrated in FIG. 2.
Figure 4:
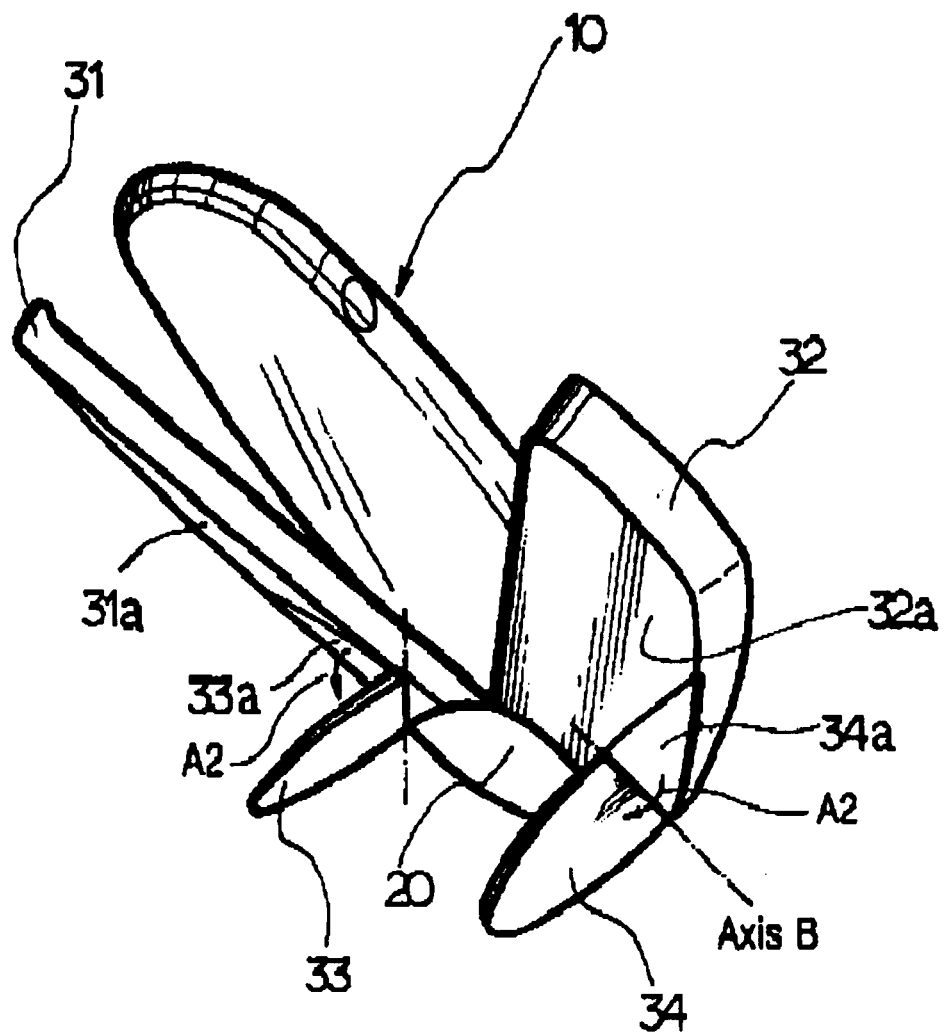
FIG. 4 is a perspective view illustrating the main housing cradled in the exchangeable housing according to the preferred embodiment of the present invention.

As illustrated in FIG. 3, the exchangeable housing 30 according to the present invention includes first and second rotational sub housings 31 and 32. The first and second rotational sub housings 31 and 32 each include cradling means on their respective bottoms 31a and 32a to cradle and tilt the main housing 10 at a predetermined angle. The cradling means includes supports 33 and 34 and receiving recesses 33a and 34a, in which the supports 33 and 34 are settled when they are not out. When the supports 33 and 34 are positioned in the receiving recesses 33a and 34a, the exchangeable housing 30 cannot cradle the main housing 10 in the titled direction. As illustrated in FIG. 4, when the exchangeable housing 30 is supported at an angle by rotating the supports 33 and 34 in the directions marked with an arrow A2 on a B axis, the main housing 10 can be cradled in the exchangeable housing 30.

Figure 5:
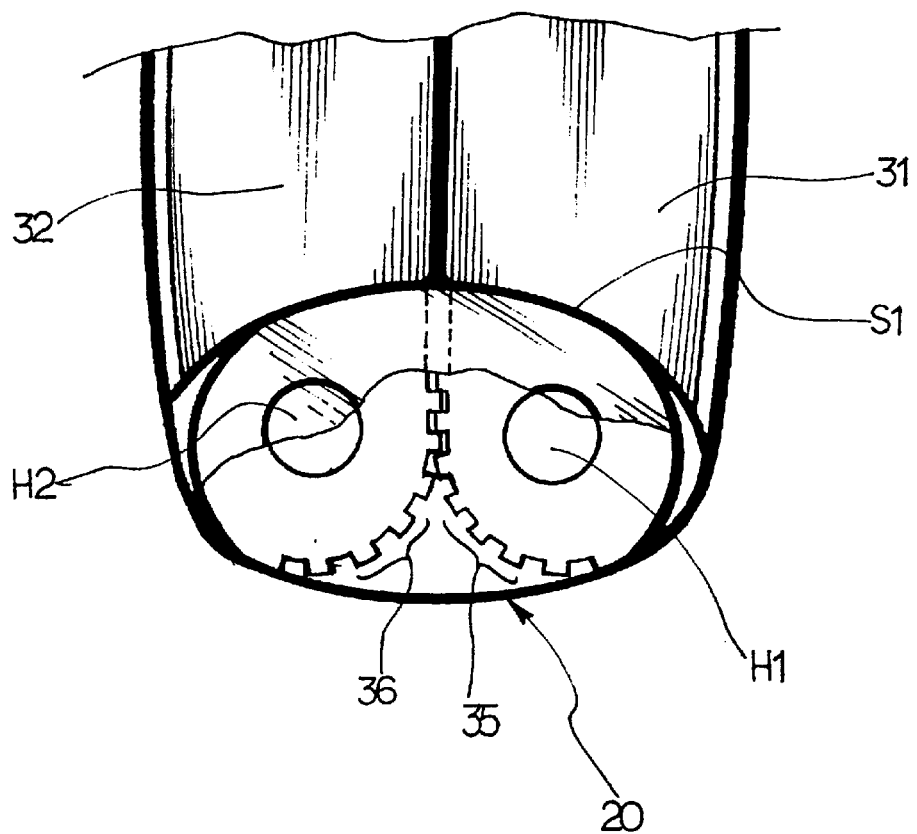
FIG. 5 is a plan view illustrating the structure of an engaging means applied to the exchangeable housing according to the preferred embodiment of the present invention.

As illustrated in FIG. 5, the holding housing 20 includes first and second hinges H1 and H2 positioned in symmetry with each other. The holding housing 20 includes a sliding surface S1 on an upper surface. The sliding surface S1 has a predetermined radius of curvature so that the exchangeable housing 30 can rotate while the sliding surface S1 contacts the sliding surface included in the exchangeable housing 30.

The holding housing 20 includes an engaging means so that the first and second sub housings 31 and 32 can rotate to be close to each other (fold in) or to be far away from each other (unfold). The engaging means includes first and second toothed wheels 35 and 36 included in one side of each of the first and second sub housings 31 and 32 respectively. The first toothed wheel 35 is engaged with the second toothed wheel 36. When the first toothed wheel 35 rotates in a counter clock-wise direction, the second toothed wheel 36 rotates in a clockwise direction. Therefore, when either one of the first or second sub housings 31 and 32 is folded in or unfolded, the other sub housing also rotates, respectively.

When folded in, the first and second rotational sub housings 31 and 32 are extended in the same direction in the form of a bar. One side of each the first and second rotational sub housings 31 and 32 are positioned in the holding housing 20, while the other sides of the first and second rotational sub housings 31 and 32 are positioned outside the holding housing 20.

Figure 6:
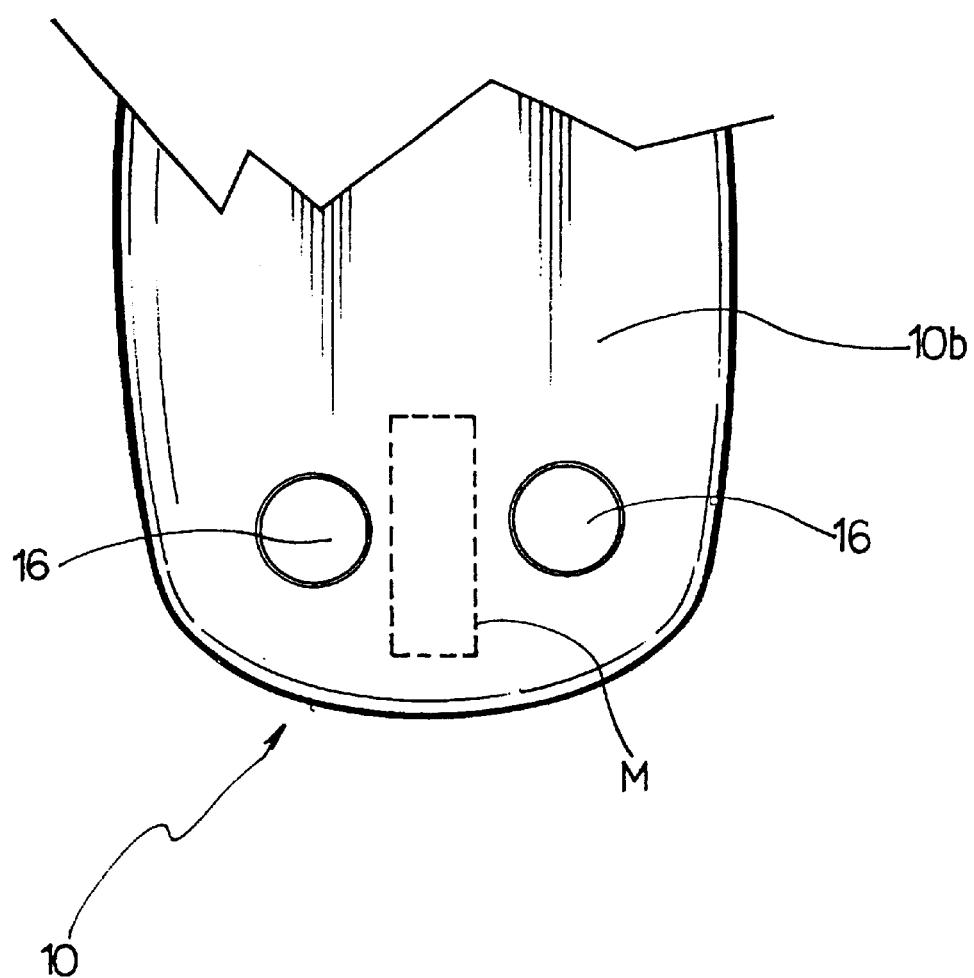
FIG. 6 is a partially cut plan view illustrating a magnet mounted on the bottom of the main housing according to the present invention.

As illustrated in FIGS. 5 and 6, in the portable telephone according to the present invention, the exchangeable housing 30 is attachable to and detachable from the main housing 10. An attaching/detaching means for easily attaching the exchangeable housing 30 to the main housing 10 and detaching the exchangeable housing 30 from the main housing 10 is constructed as follows. First, the attaching/detaching means includes a magnet M mounted on the bottom 10b of the main housing 10 and the metal holding housing 20 contacting the magnet M. Because the magnet M attracts the metal, it is possible to combine the metal holding housing 20 with the main housing 10 and to forcibly separate the metal holding housing 20 from the main housing 10. When the metal holding housing 20 is combined with the main housing 10, combination holes 16 corresponding to the hinges H1 and H2 of the holding housing 20 are positioned on the bottom of the main housing 10 in order to maintain the combined position (or state). Therefore, the combination holes 16 and the hinges H1 and H2 maintain the combined position and provide combination force to the metal holding housing 20 and the magnet M.

Various embodiments according to the functions of the exchangeable housing will now be described with reference to accompanying drawings.

Figure 7A:
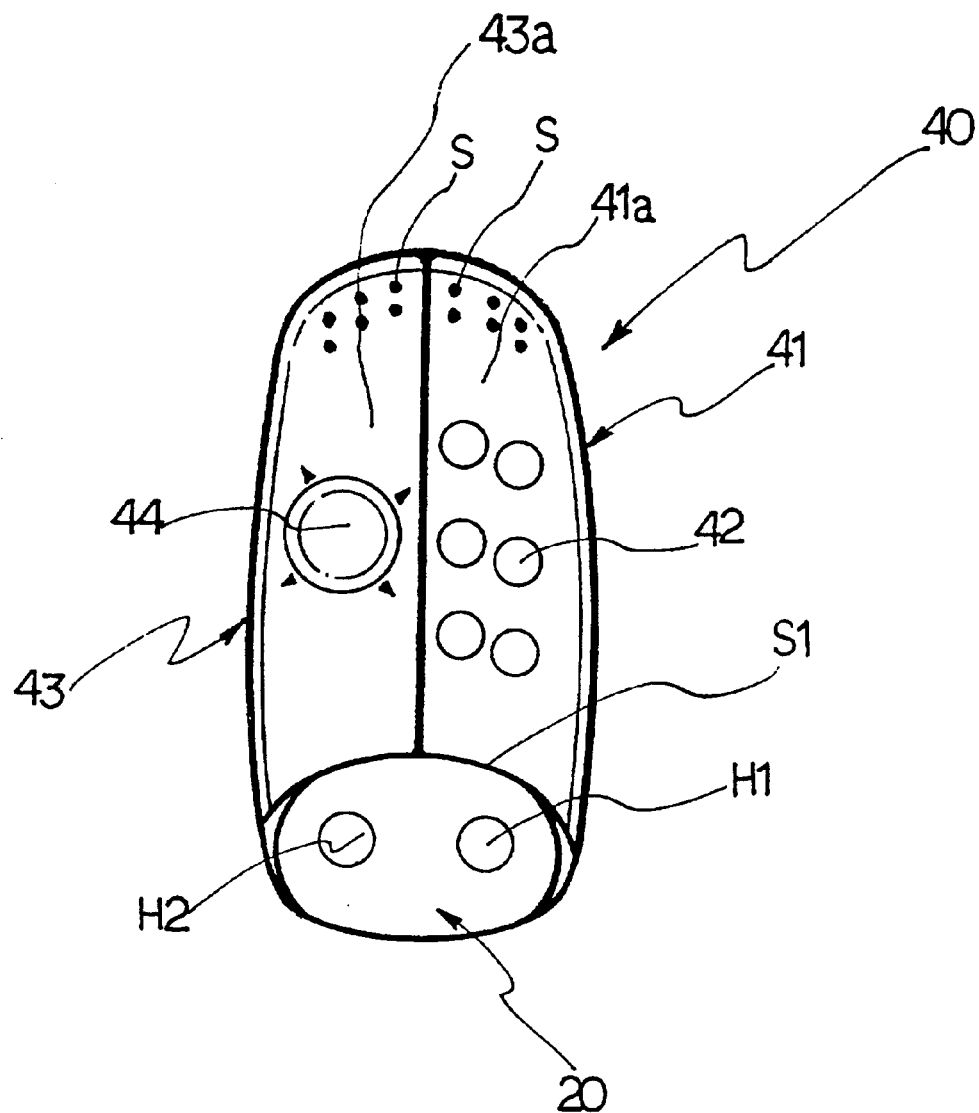
FIG. 7A is a plan view illustrating an exchangeable housing whose rotational sub housings are folded toward each other according to a first preferred embodiment of the present invention.
Figure 7B:
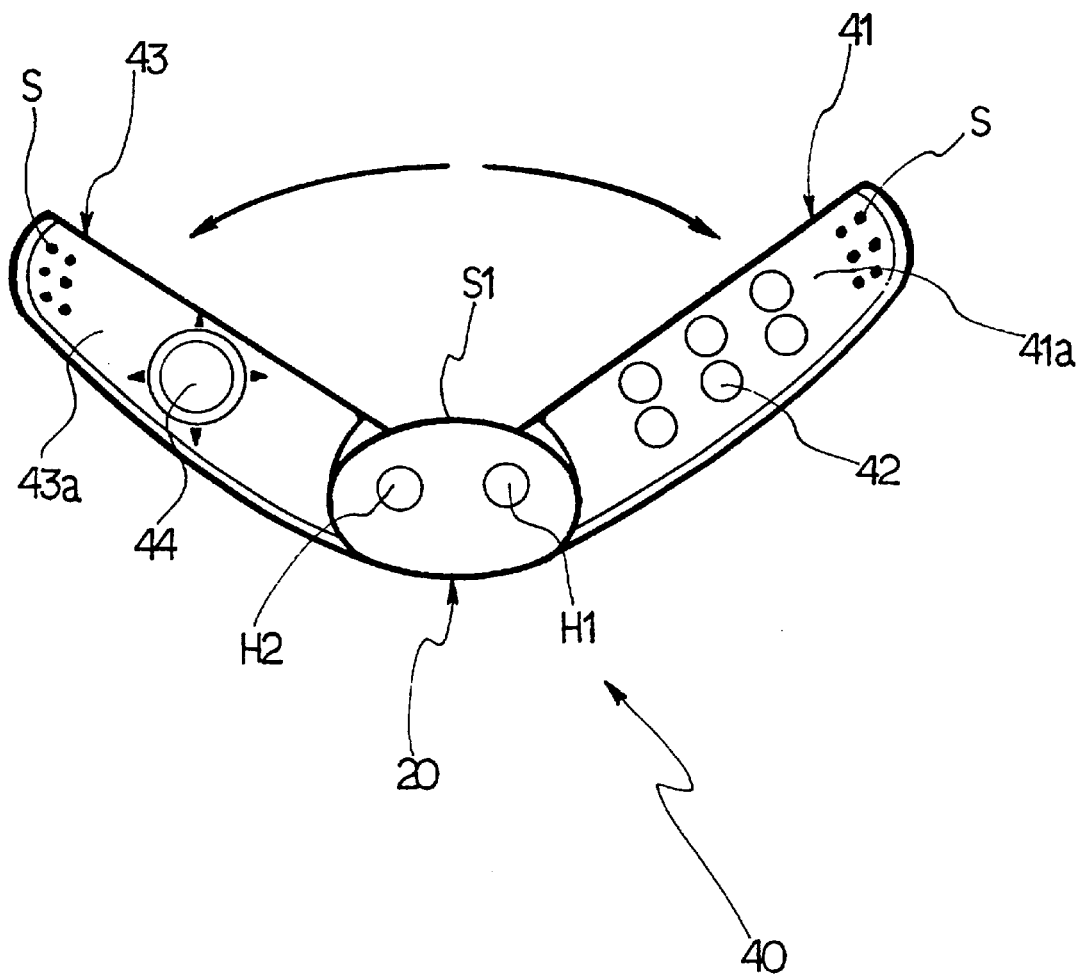
FIG. 7B is a plan view illustrating an exchangeable housing whose rotational sub housings are unfolded against each other in the V shape according to the first preferred embodiment of the present invention.
Figure 7C:
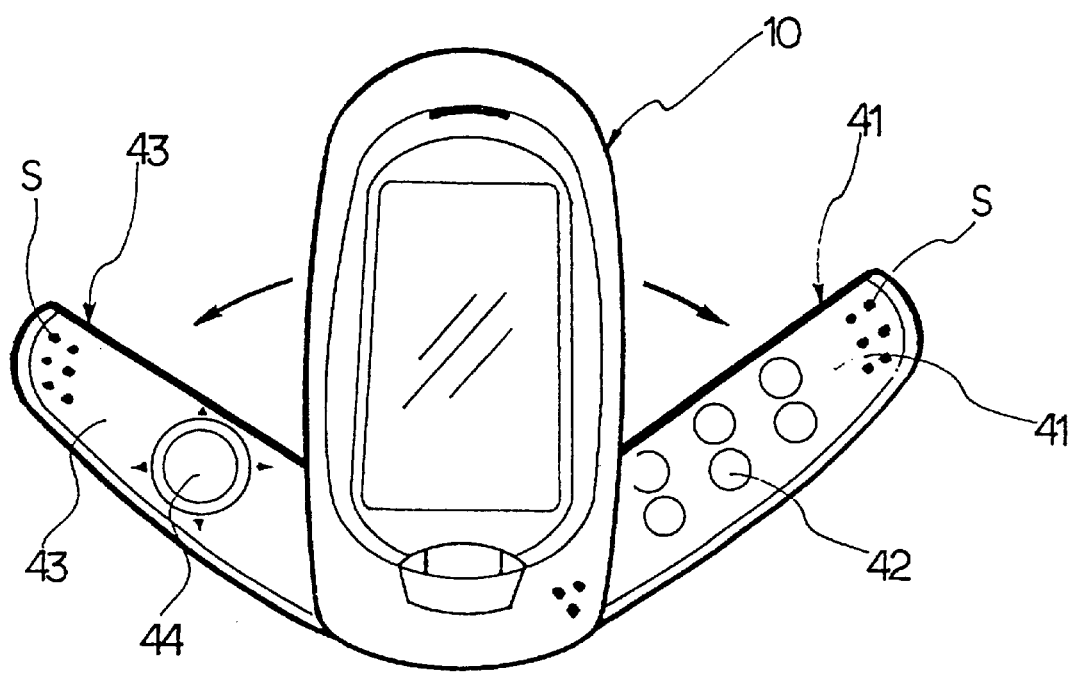
FIG. 7C is a plan view illustrating the exchangeable housing mounted on the main housing according to the first preferred embodiment of the present invention.

FIGS. 7A through 7C illustrate an exchangeable housing according to a first embodiment of the present invention. Illustrated in FIGS. 7A through 7C is an exchangeable housing 40 according to the first embodiment of the present invention designed for games. The exchangeable housing 40 includes the holding housing 20 and first and second rotational keypad housings 41 and 43, connected to each other, centering on the hinges H1 and H2 and able to rotate towards and away from each other. The first rotational keypad housing 41 includes a plurality of keys 42 and a speaker S on an upper surface 41a. The second rotational keypad housing 43 includes a 4-direction key 44 and a speaker S on an upper surface 43a. The holding housing 20 includes a sliding surface S1 with a predetermined radius of curvature so as to slide the first and second rotational keypad housings 41 and 43. Therefore, as illustrated in FIG. 7C, the first and second rotational keypad housings 41 and 43 are mounted on the bottom of the main housing 10. Accordingly, a user plays games while looking at the data displayed on the LCD 12 of the main housing 10. The first and second rotational keypad housings 41 and 43 are in the form of wings as illustrated in FIG. 7B when they are completely unfolded. Therefore, the user can easily manipulate keys in the exchangeable housing 40.

Figure 8A:
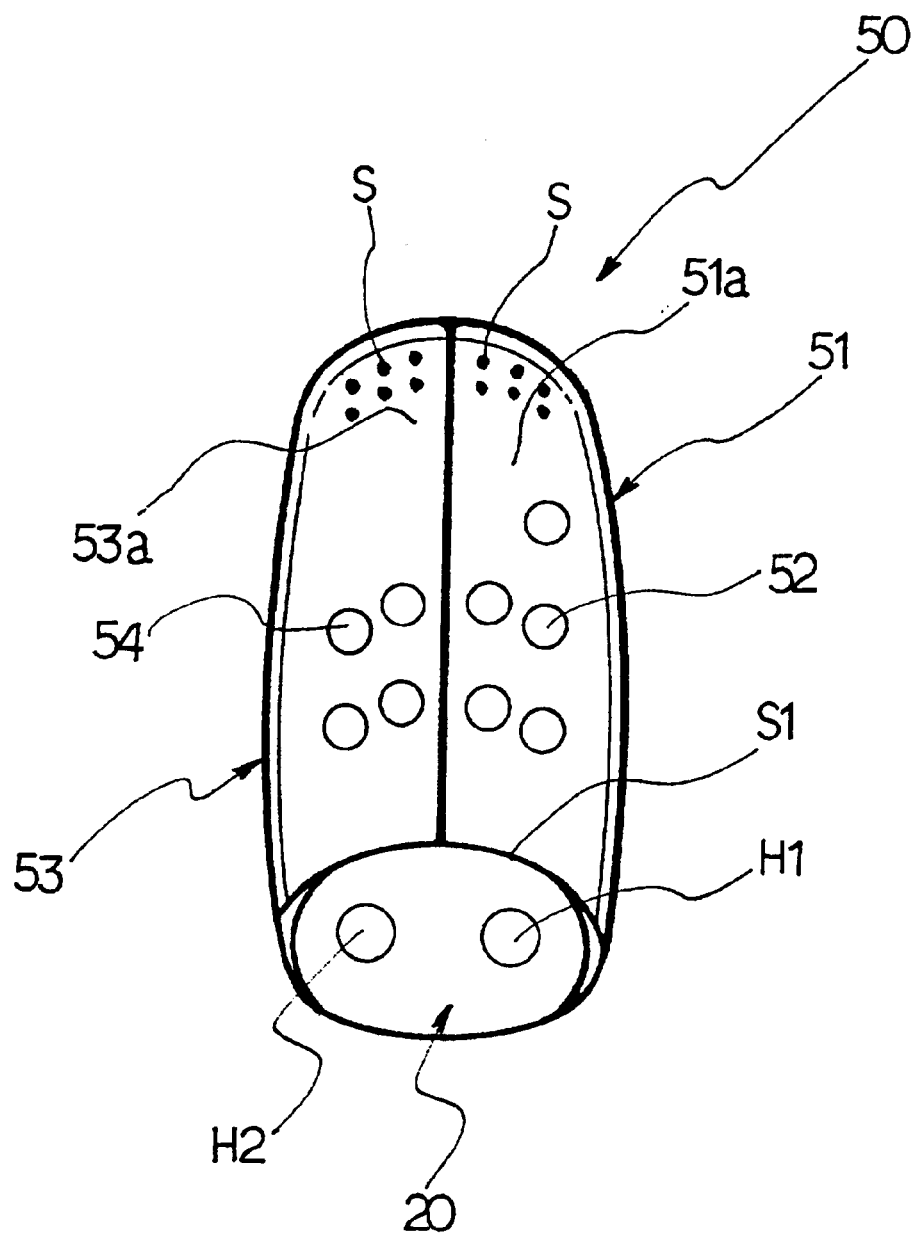
FIG. 8A is a plan view illustrating an exchangeable housing whose rotational sub housings are folded toward each other according to a second preferred embodiment of the present invention.
Figure 8B:
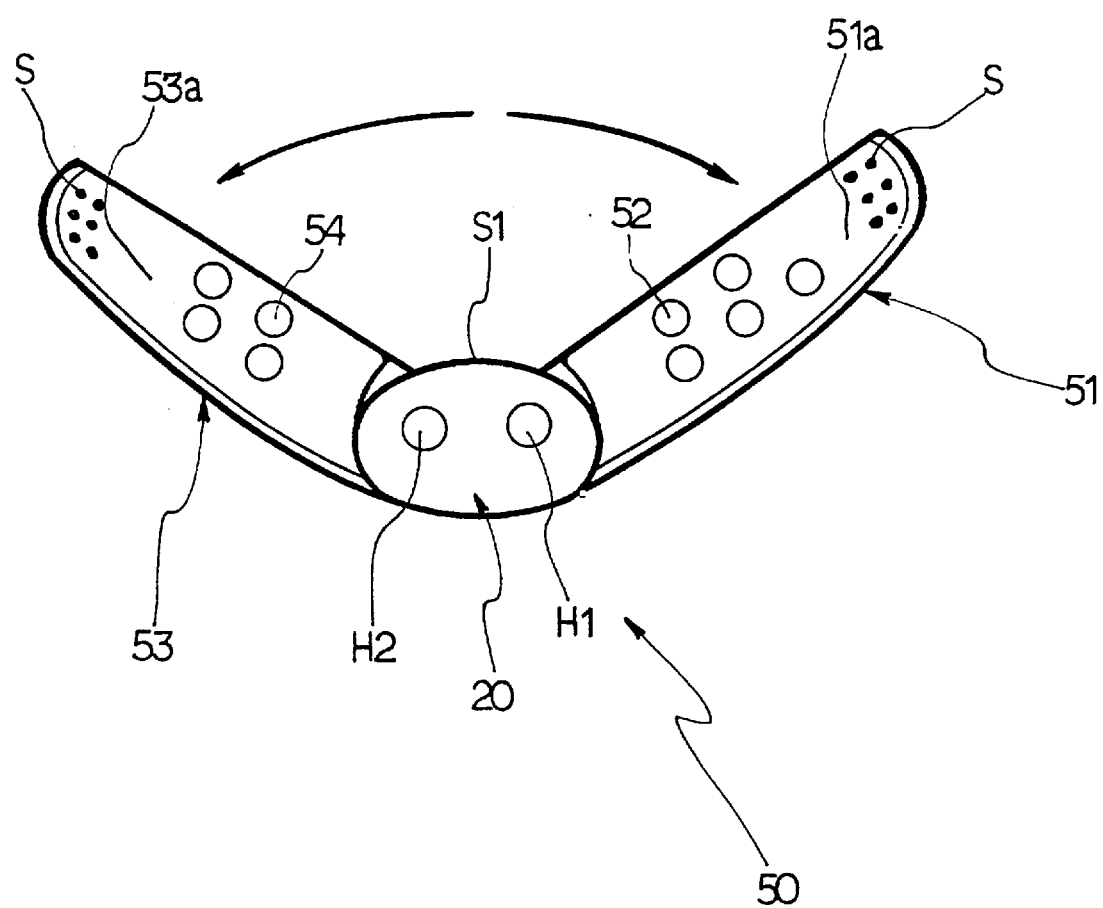
FIG. 8B is a plan view illustrating an exchangeable housing whose rotational sub housings are unfolded against each other in the V shape according to the second preferred embodiment of the present invention.
Figure 8C:
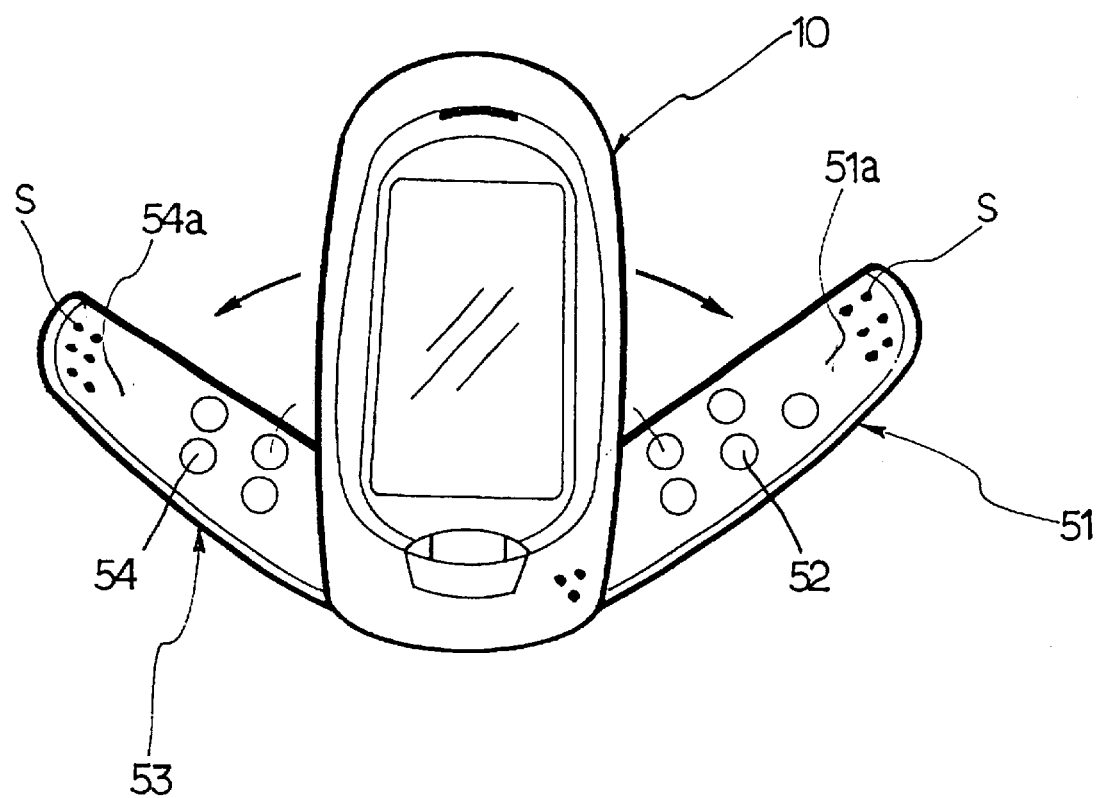
FIG. 8C is a plan view illustrating the exchangeable housing according to the second preferred embodiment mounted on the main housing.

FIGS. 8A through 8C illustrate an exchangeable housing according to a second embodiment of the present invention. Illustrated in FIGS. 8A through 8C is an exchangeable housing 50 according to the second embodiment designed for the MP3. The exchangeable housing 50 includes the holding housing 20 and first and second rotational keypad housings 51 and 53, connected to each other centering on the hinges H1 and H2 included in the holding housing 20 and rotatable to be folded in and unfolded. The first rotational keypad housing 51 includes a plurality of keys 52 and a speaker S on an upper surface 51a. The second rotational keypad housing 53 includes a plurality of keys 54 and a speaker S. The holding housing 20 includes a sliding surface S1 with a predetermined radius of curvature so as to slide the first and second rotational keypad housings 51 and 53. Therefore, as illustrated in FIG. 8C, the first and second rotational keypad housings 51 and 53 are mounted on the main housing 10 and the user controls the MP3 while looking at the data displayed on the LCD 12 of the main housing 10. The first and second rotational keypad housings 51 and 53 are in the form of wings as illustrated in FIG. 8B when they are completely unfolded. Therefore, the user can easily manipulate keys in the exchangeable housing 50.

Figure 9A:
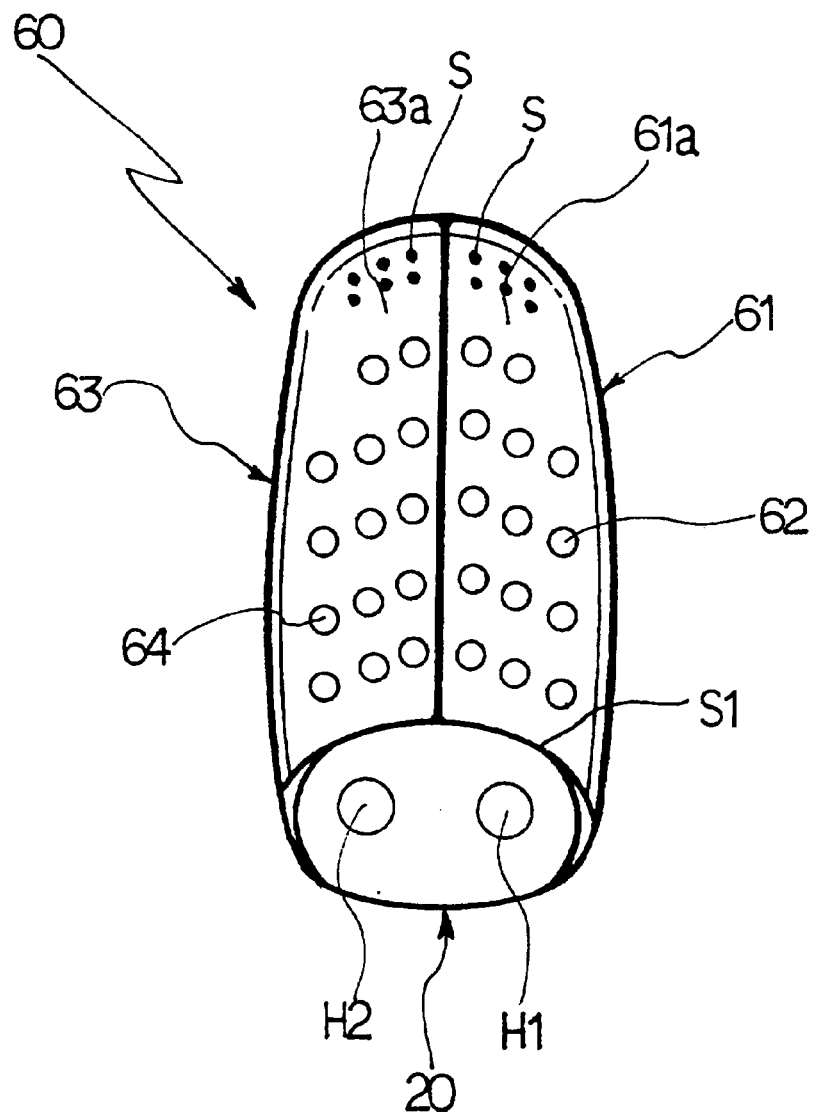
FIG. 9A is a plan view illustrating an exchangeable housing whose rotational sub housings are folded toward each other according to a third preferred embodiment of the present invention.
Figure 9B:
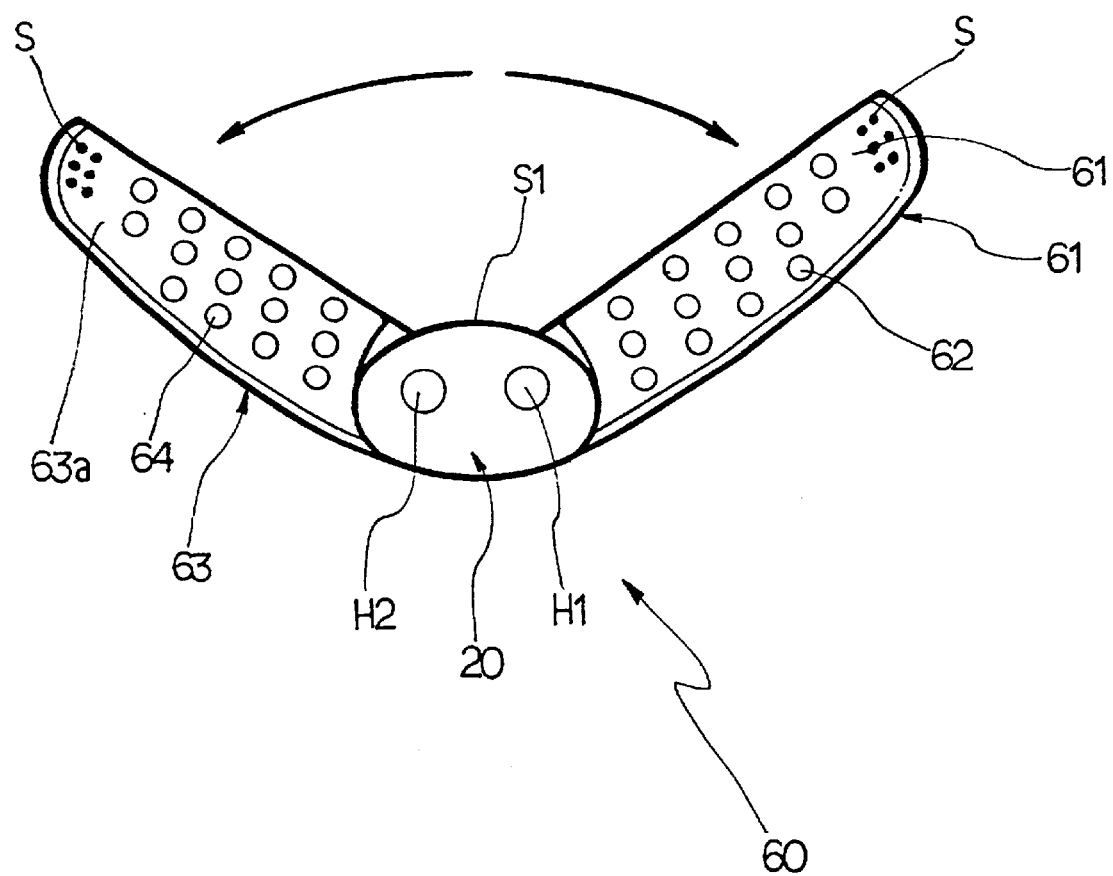
FIG. 9B is a plan view illustrating an exchangeable housing whose rotational sub housings are unfolded against each other in the V shape according to the third preferred embodiment of the present invention.
Figure 9C:
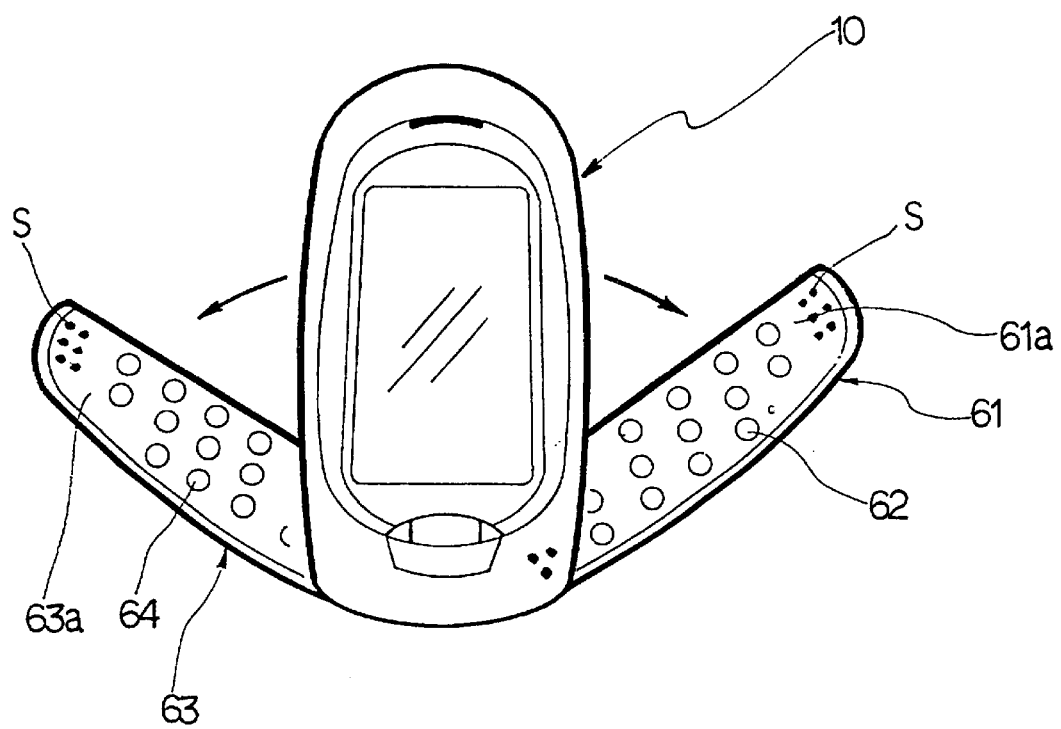
FIG. 9C is a plan view illustrating the exchangeable housing according to the third preferred embodiment of the present invention mounted on the main housing.

FIGS. 9A through 9C illustrate an exchangeable housing according to a third embodiment of the present invention. As illustrated in FIGS. 9A through 9C, an exchangeable housing 60 according to the third embodiment of the present invention is designed for chatting, e-mail transmission, and radio Internet communications. The exchangeable housing 60 includes first and second rotational keypad housings 61 and 63, connected to each other centering on the hinges H1 and H2 included in the holding housing 20 and rotatable to be close to each other or to be far away from each other. The first rotational keypad housing 61 includes a plurality of keys 62 and a speaker S on an upper surface 61a. The second rotational keypad housing 63 includes a plurality of keys 64 and a speaker S on an upper surface 63a. The first and second rotational keypad housings 61 and 63 include more keys than the exchangeable housings for games and the MP3 in consideration having to input complicated data such as various complicated characters and words and phrases.

The holding housing 20 includes a sliding surface S1 with a predetermined radius of curvature so as to slide the first and second rotational keypad housings 61 and 63. Therefore, as illustrated in FIG. 9B, the first and second rotational keypad housings 61 and 63 are mounted on the main housing 10 and the user performs chatting and e-mail transmission while looking at the data displayed on the LCD 12 of the main housing 10. Also, the first and second rotational keypad housings 61 and 63 are in the form of wings as illustrated in FIG. 9B when they are completely unfolded. Therefore, the user can easily manipulate keys. As a result, the portable telephone according to the present invention can actively cope with various multimedia environments.

Figure 10:
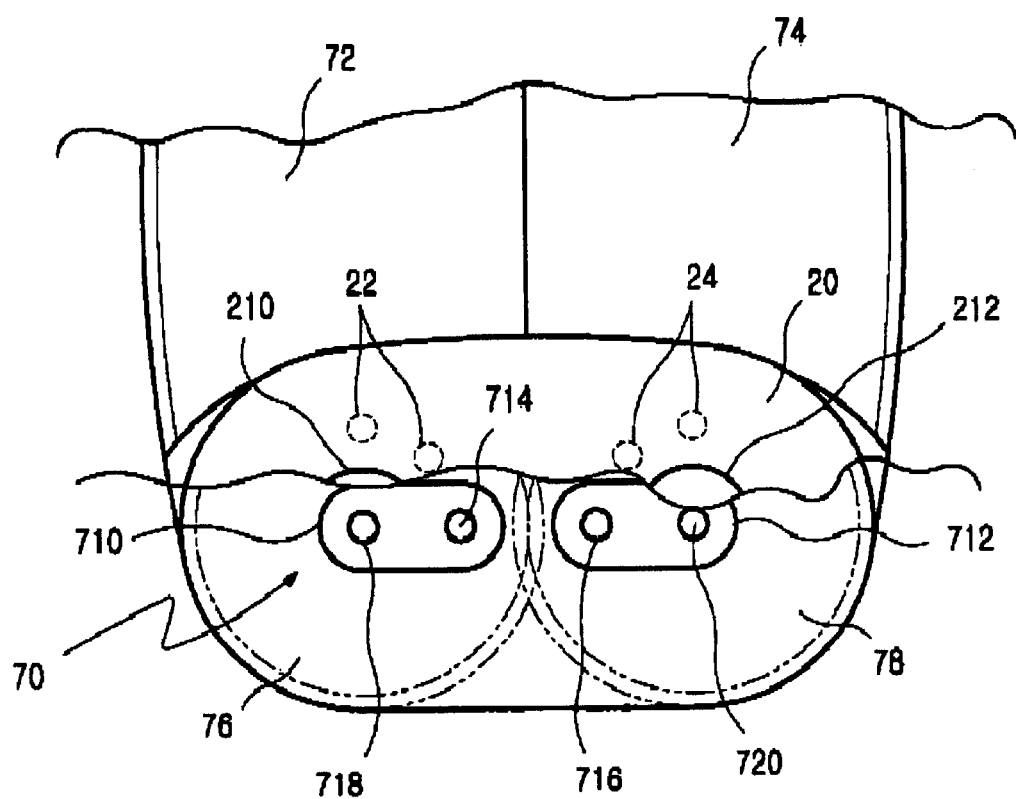
FIG. 10 is a partially cut plan view illustrating a rotation angle control device adopted to a holding housing with an exchangeable data input apparatus of a portable telephone according to the present invention.
Figure 11:
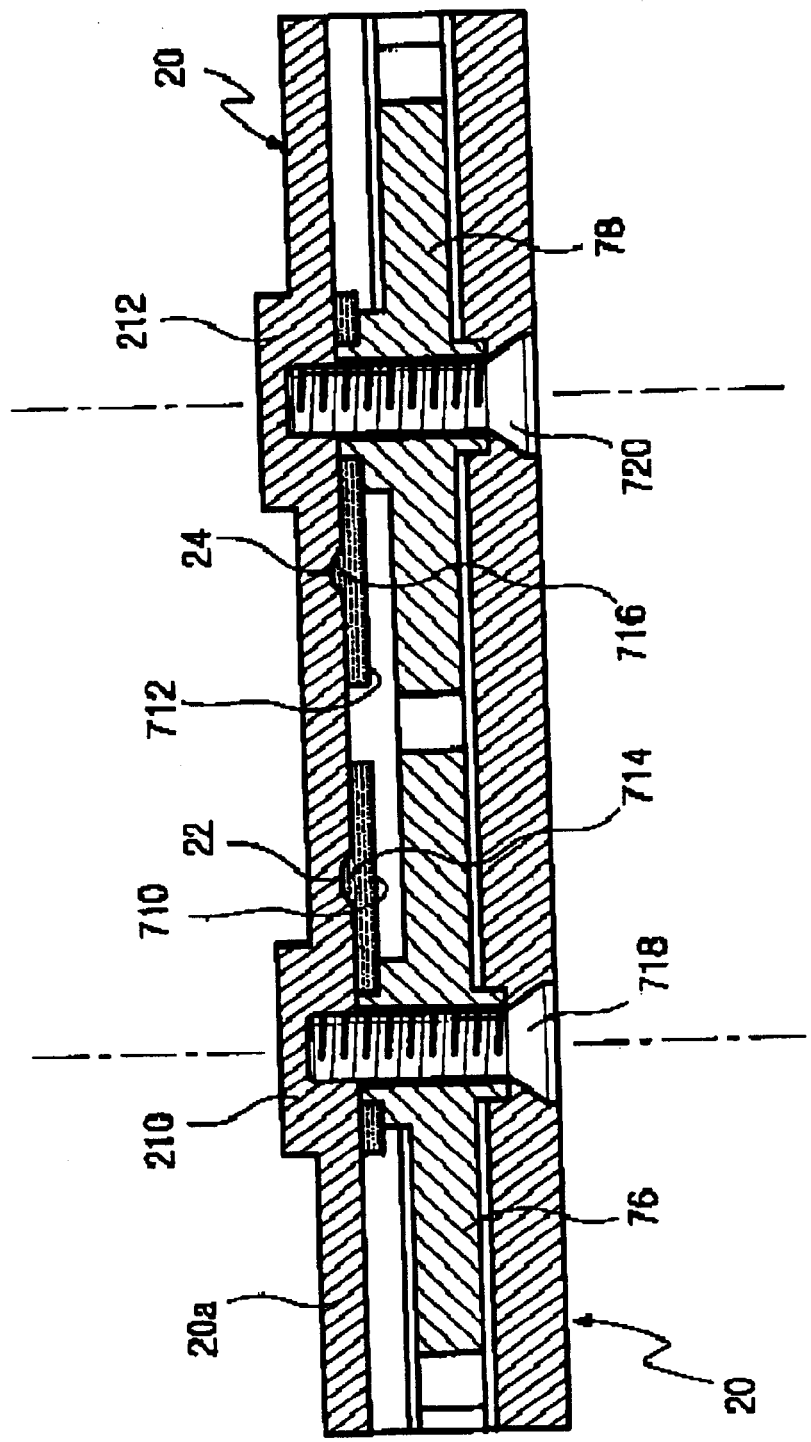
FIG. 11 is a side sectional view of the rotation angle control device illustrated in FIG. 10.

FIGS. 10 and 11 illustrate the structure of a rotation angle control device 70 provided to a holding housing 20 as applied to the portable telephone according to the present invention. The holding housing 20 includes the rotation angle control device 70 that controls the angle, at which first and second sub housings 72 and 74 are folded toward and unfolded away other, as desired by a user. As illustrated in FIGS. 10 and 11, the rotation angle control device 70 includes first and second gears 76 and 78 provided in the first and second sub housings 72 and 74 to be integrated with each other and mounted in the holding housing 20 to be geared with each other, first and second plate springs 710 and 712 fixed on the first and second gears 76 and 78 to face each other, and a locking device for controlling the rotation angle of the first and second sub housings 72 and 74.

The locking device includes first and second fixing protrusions 714 and 716 formed around the free ends of the first and second plate springs 710 and 712, and first and second fixing holes 22 and 24 provided on the ceiling 20a of the holding housing 20 in an outer circumferential direction to have a predetermined size of diameter. The first and second fixing protrusions 714 and 716 are combined with and separated from the first and second fixing holes 22 and 24 respectively. Therefore, when the first and second sub housings 72 and 74 unfold, the first and second gears 76 and 78 engaged with each other also rotate. Accordingly, the first and second plate springs 710 and 712 rotate. When the first and second fixing protrusions 714 and 716 are combined with the first and second fixing holes 22 and 24 respectively, the first and second sub housings 72 and 74 can be locked. The first and second plate springs 710 and 712 are mounted on the first and second gears 76 and 78 in a press fitting way. The first and second fixing protrusions 714 and 716 are preferably provided to be hemispherical so as to be easily attached and detached.

The first and second gears 76 and 78 rotatably move along a hinge axis positioned in first and second hinge shafts 718 and 720 within a predetermined angle according to whether the first and second sub housings are folded toward or unfolded away from each other.

While the invention has been shown and described with reference to a certain preferred embodiment thereof, it will be understood by those skilled in the art that various changes in form and details may be made therein without departing from the spirit and scope of the invention as defined by the appended claims. For example, the exchangeable housing according to the present invention includes two keypad housings. However, the exchangeable housing can include three or more keypad housings. Also, the exchangeable housing has been illustrated with a bar-type phone but could also be used with other types of portable phones.

As mentioned above, the portable telephone according to the present invention includes the exchangeable housing, so that the user can exchange the exchangeable housing as occasion demands. Accordingly, it is convenient for the user to manipulate the portable telephone. Also, it is possible for the user to separately carry the main housing and the exchangeable housing, thus improving portability. Also, because the rotational sub housings of the exchangeable housing can be unfolded away from each other in the form of wings, it is convenient for the user to input data.

What is claimed is:

1. A portable telephone, comprising:
    a main housing;
    a holding housing separable from a first hinge and a second hinge and attachable to and detachable from the main housing, the first and second hinges positioned to face each other, to be protrusive, and to be symmetrical with each other, and a sliding surface with a predetermined radius of curvature; and
    an exchangeable housing having bar-type first and second rotational sub housings, each with one side connected to the first and second hinges so that the first and second rotational sub housings are hidden in the main housing when they rotate to be folded in and are in the form of wings protruding from both sides of the main housing when they rotate to be unfolded.

2. The portable telephone of claim 1, wherein the first and second rotational sub housings are a keypad housing for games, the first rotational sub housing having a plurality of keys and a speaker, and the second rotational sub housing having a 4-direction key and a speaker.

3. The portable telephone of claim 1, wherein the first and second sub housings each comprise cradling means on respective bottom portions thereof so as to cradle the main housing.

4. The portable telephone of claim 3, wherein the cradling means are formed of supports rotatably folded toward and unfolded away from each other on a bottom of the exchangeable housing, the supports cradling the main housing.

5. The portable telephone of claim 1, wherein the main housing comprises:
    a liquid crystal display (LCD) positioned in a center of the housing;
    a speaker positioned on a side of the LCD;
    a microphone positioned on a side of the LCD opposite the speaker; and
    a scroll key positioned between the LCD and the microphone.

6. The portable telephone of claim 1, wherein the exchangeable housing is a keypad housing for a Music Player 3 (MP3), and the keypad housing for the MP3 comprises at least one key and speaker.

7. The portable telephone of claim 1, wherein the exchangeable housing is a keypad housing for chatting, and the keypad housing for chatting comprises character and number keys for typing performed by both hands of a user.

8. The portable telephone of claim 1, wherein the exchangeable housing comprises an engaging means received in the holding housing that simultaneously rotates the first and second rotational sub housings so that the first and second rotational sub housings fold in and unfold simultaneously.

9. The portable telephone of claim 8, wherein the engaging means comprises:
    a first toothed wheel included in one end of the first sub housing having a predetermined length; and
    a second sub housing included in one end of the second sub housing having the same predetermined length and engaged with the first toothed wheel.

10. The portable telephone of claim 1, wherein the holding housing comprises a rotation angle control device for controlling a rotation angle of the first and second sub housings.

11. The portable telephone of claim 10, wherein the rotation angle control device comprises:
    first and second plate springs provided in one end of each of the first and second sub housings positioned in the holding housing and coaxially fixed to rotation axes of the first and second housing;
    first and second fixing protrusions respectively provided to a free end of each of the plate springs; and
    at least first and second fixing holes provided on a surface of the holding housing in an outer circumferential direction, with which the first and second fixing protrusions are combined and from which the first and second fixing protrusions are separated.

12. The portable telephone of claim 11, wherein the first and second fixing protrusions and the first and second fixing holes are formed to be hemispherical in shape.

13. The portable telephone of claim 11, wherein the first and second plate springs are formed to face each other.

* * * * *